(12) United States Patent
Kang et al.

(10) Patent No.: US 11,760,645 B2
(45) Date of Patent: Sep. 19, 2023

(54) METHOD FOR RECYCLING SUPERCRITICAL WASTE LIQUID GENERATED DURING PROCESS OF PRODUCING SILICA AEROGEL BLANKET

(71) Applicant: LG CHEM, LTD., Seoul (KR)

(72) Inventors: Tae Gyeong Kang, Daejeon (KR); Je Kyun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 501 days.

(21) Appl. No.: 16/754,204

(22) PCT Filed: Aug. 21, 2018

(86) PCT No.: PCT/KR2018/009617
§ 371 (c)(1),
(2) Date: Apr. 7, 2020

(87) PCT Pub. No.: WO2019/098503
PCT Pub. Date: May 23, 2019

(65) Prior Publication Data
US 2020/0270137 A1    Aug. 27, 2020

(30) Foreign Application Priority Data
Nov. 17, 2017 (KR) .................. 10-2017-0154145

(51) Int. Cl.
*C01B 33/158* (2006.01)
*C01B 33/145* (2006.01)
*C01B 33/155* (2006.01)
*C02F 1/70* (2023.01)
*C02F 101/16* (2006.01)

(52) U.S. Cl.
CPC ........ *C01B 33/1585* (2013.01); *C01B 33/145* (2013.01); *C01B 33/155* (2013.01); *C02F 1/705* (2013.01); *C02F 2101/16* (2013.01)

(58) Field of Classification Search
None
See application file for complete search history.

(56) References Cited

U.S. PATENT DOCUMENTS 5,843,389 A    12/1998  Elsner et al.
6,670,402 B1 *  12/2003  Lee .................... C01B 33/1585
                                                501/12

(Continued)

FOREIGN PATENT DOCUMENTS

CN    1382070    11/2002
CN    1740269    3/2006

(Continued)

*Primary Examiner* — Colin W. Slifka
*Assistant Examiner* — Logan Edward Laclair
(74) *Attorney, Agent, or Firm* — Bryan Cave Leighton Paisner LLP

(57) ABSTRACT

Provided is a method for recycling supercritical waste liquid generated during a process of producing a silica aerogel blanket, and a method for producing a silica aerogel blanket reusing supercritical waste liquid recycled thereby. The method for recycling supercritical waste liquid and the method for producing a silica aerogel blanket reduce the production costs and prevent the deterioration in thermal insulation performance of a silica aerogel blanket by adding a metal salt to the supercritical waste liquid by the recycling method.

8 Claims, 2 Drawing Sheets

(56) References Cited

U.S. PATENT DOCUMENTS

| | | |
|---|---|---|
| 2004/0087670 A1 | 5/2004 | Lee et al. |
| 2016/0046495 A1 | 2/2016 | Xiang |
| 2017/0369326 A1 | 12/2017 | Kim et al. |
| 2018/0010726 A1 | 1/2018 | Kim et al. |
| 2018/0179073 A1 | 6/2018 | Oh et al. |
| 2019/0107242 A1 | 4/2019 | Kim et al. |
| 2019/0152788 A1 | 5/2019 | Xiang |

FOREIGN PATENT DOCUMENTS

| | | |
|---|---|---|
| CN | 103432985 | 12/2013 |
| CN | 103708476 A | 4/2014 |
| CN | 104556969 | 4/2015 |
| CN | 104787934 A | 7/2015 |
| CN | 106592201 | 4/2017 |
| CN | 107018658 A | 8/2017 |
| CN | 107208355 A | 9/2017 |
| JP | H05-49910 | 3/1993 |
| JP | H10-503458 | 3/1998 |
| JP | H10-167733 | 6/1998 |
| JP | 11335115 A * | 12/1999 |
| JP | H11335115 | 12/1999 |
| JP | 2003-512277 | 4/2003 |
| JP | 2009198350 | 9/2009 |
| JP | 2011190548 | 9/2011 |
| KR | 10-20020062287 | 7/2002 |
| KR | 10-1434273 | 8/2014 |
| KR | 10-20160122634 | 10/2016 |
| WO | 2001-28675 | 4/2001 |
| WO | 2015-175970 | 11/2015 |

* cited by examiner

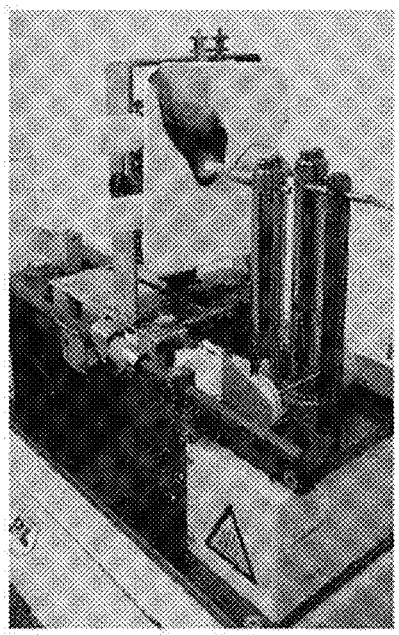 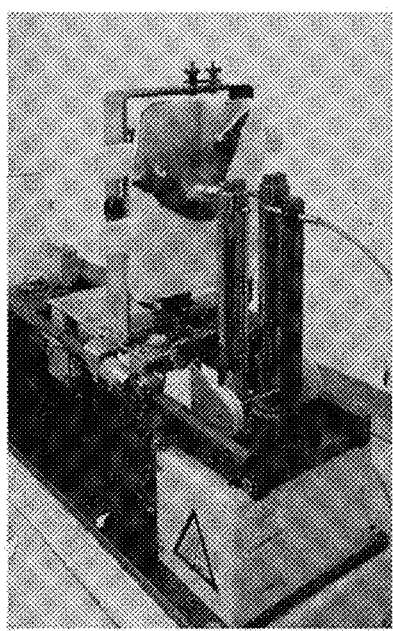
EXAMPLE 1          COMPARATIVE EXAMPLE 1
FIG. 2A                  FIG. 2B

METHOD FOR RECYCLING SUPERCRITICAL WASTE LIQUID GENERATED DURING PROCESS OF PRODUCING SILICA AEROGEL BLANKET

CROSS-REFERENCE TO RELATED APPLICATIONS

This application is a National Stage Application of International Application No. PCT/KR2018/009617 filed on Aug. 21, 2018, which claims the benefit of Korean Patent Application No. 10-2017-0154145, filed on Nov. 17, 2017, in the Korean Intellectual Property Office, the disclosure of which is incorporated herein in its entirety by reference.

TECHNICAL FIELD

The present invention relates to a method for recycling a supercritical waste liquid generated during a process of producing a silica aerogel blanket, and a method for producing a silica aerogel blanket using the supercritical waste liquid recycled by the above method.

BACKGROUND

Aerogel is a highly porous material composed of nanoparticles, and has high porosity, specific surface area, and low thermal conductivity, thereby attracting attention as a thermal insulation material, a soundproofing material, and the like of high efficiency. However, since the aerogel has very low mechanical strength due to the porous structure thereof, an aerogel composite in which aerogel is bonded to a fibrous blanket by being impregnated therewith, the fibrous blanket such as an inorganic fiber or an organic fiber, both of which are conventional heat insulation fibers, has been developed. For example, a blanket containing silica aerogel using silica aerogel is prepared through steps of silica sol preparation-gelation-aging-surface modification-drying. Specifically, in a typical technology, a small amount of $NH_4OH$ is used in the aging step and hexamethyl disilazane (HMDS) is used as a surface modifier. At this time, when HMDS is decomposed into trimethyl silanol (TMS) or trimethyl ethoxy silanol (TMES), $NH_3$ is generated. Some of the $NH_3$ is reacted with carbon dioxide during supercritical drying and forms ammonium carbonate salt, and some thereof remain in recycled ethanol.

Meanwhile, the aerogel blanket is not widely used in the market despite the superior thermal insulation performance thereof when compared with typical thermal insulation materials because the production cost thereof is high. Product prices of an aerogel blanket are relatively higher than those of other thermal insulation materials due to the expensive raw materials, the complex production processes, and the costs of processing a large amount of waste liquid generated during the production process thereof.

Methods of reducing costs by changing raw materials or changing production processes among the above price increase factors may directly affect the quality of products, thereby making such changes inappropriate for use. The easiest way to lower costs is to reuse waste liquid generated during a production process.

However, reusing the waste liquid may cause the following problems: first, the physical properties of an aerogel blanket may be deteriorated (increase in thermal conductivity) due to residual ammonia; second, it is difficult to control the gelation time of a precursor solution; and third, ammonium carbonate salt formed by reacting $NH_3$ with carbon dioxide used in supercritical drying can block pipes of supercritical drying equipment.

In order to solve the problems, there are methods using distillation or an ion exchange resin. However, such methods have problems in that investments in additional equipment and equipment operational costs are required. Therefore, the present invention is to propose a method capable of recycling and reusing waste liquid without having additional equipment.

PRIOR ART DOCUMENT (Patent Document 1) Korean Patent Application Publication No. 2002-0062287 (published on Jul. 25, 2002)

BRIEF DESCRIPTION

Technical Problem

An aspect of the present invention provides a method for producing a silica aerogel blanket, the method capable of reducing the production costs and preventing the deterioration in thermal insulation performance of a silica aerogel blanket by recycling and reusing supercritical waste liquid generated after supercritical drying.

Specifically, the present invention provides a method for recycling supercritical waste liquid and a method for producing a silica aerogel blanket, the methods capable of securing excellent flame retardancy without the addition of a flame retardant by means of a metal hydroxide formed by adding a metal salt to the supercritical waste liquid so as to remove ammonia present in the supercritical waste liquid and reacting the added metal salt and the ammonia.

Technical Solution

According to an aspect of the present invention, provided is a method for recycling supercritical waste liquid, the method characterized by adding a metal salt to supercritical waste liquid generated in a supercritical drying step during a process of producing a silica aerogel blanket.

According to another aspect of the present invention, there is provided a method for producing a silica aerogel blanket, the method characterized by using the supercritical waste liquid recycled by the method for recycling supercritical waste liquid.

Advantageous Effects

According to the present invention, supercritical waste liquid generated during a process of producing a silica aerogel blanket is recycled and reused by the method for recycling supercritical waste liquid of the present invention, so that it is possible to produce a silica aerogel blanket, the production costs of which are reduced and the deterioration in thermal insulation performance of which is prevented.

Specifically, according to the present invention, it is possible to produce a silica aerogel blanket, the excellent flame retardancy of which is obtained without the addition of a flame retardant by means of metal hydroxide formed by adding a metal salt to the supercritical waste liquid so as to remove ammonia present in the supercritical waste liquid by reacting the added metal salt and the ammonia.

In addition, the method for recycling supercritical waste liquid of the present invention is simple, economical, and safe to use when compared to typical recycling methods since no separate facility is required.

BRIEF DESCRIPTION OF THE DRAWINGS

The following drawings attached herein illustrate preferred embodiments of the present invention by example, and serve to enable technical concepts of the present invention to be further understood together with detailed description of the invention given below, and therefore the present invention should not be interpreted only with matters in such drawings.

FIG. 2A is a photograph showing the results of a flame retardancy test of the silica aerogel blankets according to Example 1 and FIG. 2B is a photograph showing the results of a flame retardancy test of the silica aerogel blankets according to Comparative Example of the present invention.

DETAILED DESCRIPTION

Figure 1:
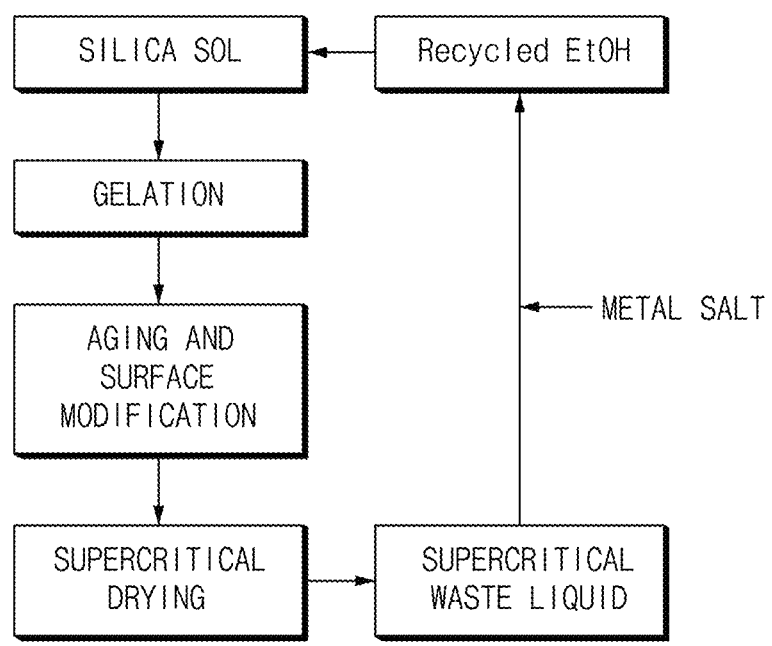
FIG. 1 is a flowchart showing the method for recycling supercritical waste liquid and the method for producing silica aerogel of the present invention.

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor can properly define the meaning of the words or terms to best explain the invention.

The purpose of the present invention is to provide a method for recycling supercritical waste liquid and a method for producing a silica aerogel blanket, the methods capable of reducing the production costs and preventing the deterioration in thermal insulation performance of a silica aerogel blanket by recycling and reusing the supercritical waste liquid generated after supercritical drying.

Therefore, a method for recycling supercritical waste liquid according to an embodiment of the present invention is characterized by adding a metal salt to a supercritical waste liquid generated in a supercritical drying step during a process of producing a silica aerogel blanket, and a method for producing a silica aerogel blanket comprising reusing the supercritical waste liquid recycled by the method for recycling supercritical waste liquid.

Hereinafter, the method for recycling supercritical waste liquid and the method for producing a silica aerogel blanket of the present invention will be described in detail.

Method for Recycling Supercritical Waste Liquid

A method for recycling supercritical waste liquid according to an embodiment of the present invention is characterized by adding a metal salt to supercritical waste liquid generated in a supercritical drying step during a process of producing a silica aerogel blanket.

The supercritical waste liquid of the present invention refers to waste liquid generated after supercritical drying, and can contain water, an organic solvent, and ammonia. The organic solvent can be one or more selected from the group consisting of methanol, ethanol, hexane, isopropanol, and pentane, and more specifically ethanol.

Meanwhile, the supercritical waste liquid of the present invention can be obtained by simultaneously applying a plurality of pressure pulses to a solvent and a supercritical fluid contained in silica gel in the supercritical drying step.

At least two of the plurality of pressure pulses are characterized by having at least one feature of being of different frequencies and being of different amplitudes, so that it is possible to rapidly exchange the solvent contained in the silica gel with the supercritical fluid so as to rapidly obtain the supercritical waste fluid, thereby greatly shortening the production time of a silica aerogel blanket.

Silica aerogel, which is widely used as a thermal insulation material in construction or industrial fields, has a disadvantage in that when the surface thereof is not hydrophobicized, water in the air is absorbed due to the hydrophilic properties of a silanol group (Si—OH) on the surface of silica, so that the thermal conductivity is gradually increased. Also, there is a problem in that it is difficult to manufacture a super-thermal insulation product having a meso pore since it is difficult to expect a spring back phenomenon due to the intensified pore collapse in a drying process.

Therefore, in order to maintain a low thermal conductivity by suppressing the absorption of moisture in the air, a step of modifying the surface of the silica aerogel so as to be hydrophobic is essentially required. In general, silica aerogel is prepared through steps of silica precursor solution preparation-gelation-aging-surface modification-drying.

Meanwhile, a surface modifier used in the surface modification step forms ammonia during a hydrophobic process of the surface of silica aerogel. Therefore, when the supercritical waster liquid is reused as a solvent in a preparation step of silica sol without removing ammonia, the pH of a silica sol solution is increased by the ammonia contained in the reused supercritical waster liquid, making it difficult to control gelation time, thereby making it impossible to produce a product having desired physical properties. Furthermore, the ammonia may block pipes of supercritical drying equipment by forming ammonium carbonate salt by reacting with carbon dioxide during supercritical drying, and some of ammonia may remain in the supercritical waste liquid to cause problems such as increasing the thermal conductivity of a finally produced silica aerogel or silica aerogel blanket.

Therefore, in order to reduce production costs of a silica aerogel blanket and prevent the deterioration in thermal insulation performance of a final product, which is the purpose of the present invention, it is essential to remove residual ammonia contained in supercritical waste liquid before reusing the supercritical waste liquid.

Typically, supercritical waste liquid is recycled by methods such as distillation, or neutralization by adding an ion exchange resin or acid. The method using distillation or an ion exchange resin requires investments in additional equipment and equipment operational costs so that economic feasibility and processability are not good. The method using neutralization has a disadvantage in that the safety is deteriorated due to an intense neutralization reaction and neutralization heat, and the corrosion of pipes and mechanical devices occurs due to the use of acid.

In the method for recycling supercritical waste liquid of the present invention, a metal salt is added to the supercritical waste liquid so as to form metal hydroxide formed by reacting with ammonia contained in the supercritical waste liquid, thereby simply and safely removing the ammonia contained in the supercritical waste liquid.

In the present invention, as a metal salt, one or more salts selected from the group consisting of $MgCl_2$, $MgSO_4$, $CaCl_2$, $CaSO_4$, $AlCl_3$ and $Al_2(SO_4)_3$ can be used. More specifically, it is preferable to use MgCl$_2$ or MgSO$_4$ in consideration of the reactivity.

When MgCl$_2$ is added as a metal salt in an embodiment of the present invention, it is possible to remove ammonia contained in supercritical waste liquid by forming magnesium hydroxide according to Formula 1 below.

$MgCl_2 + 2NH_4OH \rightarrow Mg(OH)_2 + 2NH_4Cl$ [Formula 1]

Since the metal hydroxide is capable of acting as a flame retardant material, it is possible to secure excellent flame retardancy of the silica aerogel blanket without the addition of a flame retardant material. In addition, since a flame retardant material is already disposed in the recycled supercritical waste liquid, there are additional advantages in that it is possible to omit a process of dispersing a flame retardant material, and reduce raw material purchase costs for buying a flame retardant material.

Meanwhile, in the present invention, the metal salt can be added in an amount such that the molar ratio of the metal salt:ammonia contained in the supercritical waste liquid is 1:3 to 1:1, more specifically 1:2 to 1:1. Adding a metal salt in the above range is desirable for ammonia removal efficiency and metal salt costs reduction.

When a metal salt is added less than the above range, the residual ammonia may not be completely removed so that the recycling effect of the supercritical waste liquid may be insignificant. When such supercritical waste liquid is reused, the gelation time in a gelation step is rapidly increased so that there may problems in that it is difficult to control processing time and physical properties of a finally produced aerogel, or the physical properties of the aerogel blanket are deteriorated. When added greater than the above range, the gelation during a process of producing an aerogel blanket may not be uniformly achieved due to the electrostatic effect of the excess unreacted metal salt, so that there may be a problem in that the physical properties of the aerogel blanket may be deteriorated.

Meanwhile, the present invention can further include a step of reacting the metal salt by stirring at room temperature for 30 minutes to 2 hours after the addition of the metal salt. The metal salt of the present invention has excellent reactivity with ammonia, thereby being capable of reacting at room temperature without additional heat treatment. However, the present invention allows the added metal salt to be evenly dispersed in the supercritical waste liquid by adding a stirring process so that the recycling of time supercritical waste liquid can be further shortened.

Method for Producing Silica Aerogel Blanket

A method for producing a silica aerogel blanket according to an embodiment of the present invention is characterized by reusing the recycled supercritical waste liquid in producing a silica aerogel blanket.

In the method for producing a silica aerogel blanket according to an embodiment of the present invention, the recycled supercritical waste liquid can be reused in one or more steps selected from the group consisting of a silica sol preparation step, an aging step, and a surface modification step, more specifically in a silica sol preparation step.

In addition, the method for producing a silica aerogel blanket of the present invention can further include a step of recycling aged waste liquid and surface-modified waste liquid during a process of producing the silica aerogel blanket, and reusing the same in one or more steps of the aging step and the surface modification step.

In other words, aged waste liquid and surface-modified waste liquid recycled through the aging step and the surface modification step can also be recycled so as to be reused in the production process of the next batch of silica aerogel blanket, and can be specifically reused in one or more steps of the aging step and the surface modification step. The aged waste solution and the surface-modified waste solution reused in the aging step and the surface modification step do not cause the deterioration in thermal insulation performance of the silica aerogel blanket even though a large amount of ammonium ions are included therein, and thus can be used without separate processing, thereby reducing production costs.

According to the present invention, the recycled supercritical waste liquid to be reused can be 85 wt % or greater based on the total weight of an organic solvent used in producing the silica aerogel blanket, and the amount of the recycled supercritical waste liquid to be reused in preparing the silica sol can be 50 wt % to 90 wt % based on the total weight of an organic solvent used in preparing the silica sol, so that it is possible to significantly reduce production costs.

When reused less than the above range, the effect of reducing production costs may not be significant, and when reused greater than the above range, there may be a problem that cannot prevent the deterioration in physical properties of the silica aerogel blanket.

A silica aerogel blanket produced by recycling and reusing supercritical waste liquid of the present invention can exhibit a thermal insulation performance of a thermal conductivity of 16 mW/mK or less at room temperature (25° C.), which is equivalent to or similar to that of a silica aerogel blanket produced using an organic solvent used for the first time (fresh ethanol).

As described above, in the present invention, supercritical waste liquid generated during a process of producing a silica is recycled by a metal salt and reused, so that it is possible to reduce the production costs and prevent the deterioration in thermal insulation performance of a silica aerogel blanket. Furthermore, since metal hydroxide formed by adding the metal salt exhibits the effect of a flame retardant agent, a silica aerogel blanket capable of securing excellent flame retardancy without the additional introduction of a flame retardant agent can be produced.

Hereinafter, examples of the present invention will be described in detail so that those skilled in the art can easily carry out the present invention. The present invention can, however, be embodied in many different forms and is not limited to the examples set forth herein.

Examples 1 to 5

Tetraethyl orthosilicate (TEOS), water and ethanol were mixed in a weight ratio of 1:2:21 to prepare a silica sol. Thereafter, the silica sol was added with a base catalyst solution prepared by diluting ammonia of 0 to 1 vol % with respect to the silica sol in ethanol of 12 vol % with respect to the silica sol, and then cast on a PET fiber to induce gelation. After the gelation was completed, the silica sol was left in an ammonia solution of 1 to 10 vol % with respect to the silica sol at a temperature of 25 to 80° C. for 25 minutes to 100 minutes to be aged, and then HMDS of 1 to 10 vol % with respect to the silica sol was added thereto to perform a hydrophobic reaction for 1 to 24 hours. After the hydrophobic reaction was completed, the silica sol was placed in a supercritical extractor of 7.2 L and CO$_2$ was injected thereto. Thereafter, the temperature inside the extractor was raised to 60° C. over 1 hour, and supercritical drying was performed at 50° C. and 100 bar to produce a hydrophobic silica aerogel blanket.

At this time, supercritical waste liquid was recycled through a lower end of a separator, and a metal salt listed in Table 1 below was added to 100 g of the recycled supercritical waste liquid in an amount shown in Table 1, was reacted by stirring at room temperature for 2 hours to complete the recycling of the supercritical waste liquid.

Thereafter, a silica aerogel blanket was produced by using the recycled supercritical waste liquid (recycled ethanol) in an amount of 70 wt % of the amount of ethanol required in the preparation step of silica sol of a process of producing the next batch silica aerogel, and using fresh ethanol which is to be used for the first time for the remaining 30 wt %.

Comparative Example

A silica aerogel blanket was produced in the same manner as in Example 1 except that only fresh ethanol which is not to be reused, but to be used for the first time was used.

Experimental Example

The physical properties of each of the silica aerogel blankets produced in the Example and Comparative Example were measured, and the results are shown in Table 1, and FIGS. 2A and 2B.

1) Thickness and Room Temperature Thermal Conductivity (mW/mK, 25° C.)

A sample having a size of 30 cm×30 cm was prepared for each of the silica aerogel blankets produced in Example and Comparative Example, and the thickness and room temperature thermal conductivity thereof were measured using HFM 436 Lambda of NETZSCH Co.

2) Flame Retardancy (kg/m$^3$)

A wire was put into contact with the silica aerogel blanket samples produced in Example and Comparative Example, and then the wire was heated to 1050° C. to observe the generation of smoke and soot.

TABLE 1

| | Metal salt | Metal salt:Ammonia mol ratio | Thickness (mm) | Room temperature thermal conductivity (mW/mK) |
|---|---|---|---|---|
| Example 1 | MgCl$_2$ | 1:2 | 10.2 | 15.2 |
| Example 2 | MgSO$_4$ | 1:2 | 9.7 | 15.4 |
| Example 3 | MgSO$_4$ | 1:1 | 10.1 | 15.8 |
| Example 4 | CaCl$_2$ | 1:2 | 9.4 | 15.3 |
| Example 5 | AlCl$_3$ | 1:3 | 10.2 | 16.0 |
| Comparative Example | —(fresh ethanol) | — | 10.4 | 15.3 |

As shown in Table 1, when a silica aerogel blanket is produced by reusing supercritical waste liquid recycled by the method for recycling supercritical waste liquid of the present invention, it was confirmed that the silica aerogel blanket has physical properties equivalent to or similar to those of the silica aerogel blanket of Comparative Example in which only fresh ethanol to be used for the first time was used.

In addition, in the flame retardancy test, it was confirmed that the silica aerogel blanket of Example 1 only produced soot with no flame (see FIG. 2A), whereas the silica aerogel blanket of Comparative Example 1 produced significant smoke and soot with flames (see FIG. 2B).

From the results, it can be seen that the aerogel blanket of Example has excellent flame retardancy when compared with the aerogel blanket of Comparative Example, which can be expected to be due to metal hydroxide formed by reacting ammonia included in the supercritical waste liquid with a metal salt added in the recycling step.

From the result, it can be seen that when waste liquid is recycled and reused by the method for recycling supercritical waste liquid of the present invention, it is possible to reduce the production costs and prevent the deterioration in thermal insulation performance of a silica aerogel blanket, and furthermore, to secure excellent flame retardancy.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. A method for recycling supercritical waste liquid, the method comprising:
    adding a metal salt to a supercritical waste liquid comprising water, an organic solvent, and ammonia generated in a supercritical drying step during a process of producing a silica aerogel blanket, wherein the metal salt is added in an amount such that the molar ratio of the metal salt:ammonia contained in the supercritical waste liquid is 1:3 to 1:1;
    stirring the supercritical waste liquid after the addition of the metal salt, wherein the metal salt forms a metal hydroxide by reacting with the ammonia present in the supercritical waste liquid; and
    using the recycled supercritical waste liquid containing the metal hydroxide in at least one step of producing a silica aerogel blanket, wherein the metal hydroxide acts as a flame retardant material in the silica aerogel blanket.

2. The method of claim 1, wherein the organic solvent is one or more selected from the group consisting of methanol, ethanol, hexane, isopropanol, and pentane.

3. The method of claim 1, wherein
    the metal salt is one or more than one salt selected from the group consisting of MgCl$_2$, MgSO$_4$, CaCl$_2$), CaSO$_4$, AlCl$_3$, and Al$_2$(SO$_4$)$_3$.

4. The method of claim 1, wherein the supercritical waste liquid is obtained by simultaneously applying a plurality of pressure pulses to a solvent and a supercritical fluid contained in silica gel in the supercritical drying step, and at least two of the plurality of pressure pulses have at least one feature of being different frequencies and being different amplitudes.

5. The method of claim 1, wherein the metal salt comprises MgCl2 or MgSO$_4$ and the metal hydroxide is Mg(OH)$_2$.

6. The method of claim 1, wherein the recycled supercritical waste liquid containing the metal hydroxide is used in one or more steps selected from the group consisting of the silica sol preparation step, the aging step, and the surface modification step.

7. The method of claim 1, wherein the recycled supercritical waste liquid containing the metal hydroxide replaces 85 wt % or greater based on of the total weight of the organic solvent used in producing the silica aerogel blanket.

8. The method of claim 1, wherein the recycled supercritical waste liquid containing the metal hydroxide replaces 50 wt % to 90 wt % of the total weight of the organic solvent used in a silica sol preparation step.

\* \* \* \* \*